(12) United States Patent
Park et al.

(10) Patent No.: US 12,174,788 B2
(45) Date of Patent: Dec. 24, 2024

(54) DATA INPUT/OUTPUT METHOD USING STORAGE NODE-BASED KEY-VALUE STORE

(71) Applicants: GLUESYS CO., LTD., Anyang-si (KR); SOGANG UNIVERSITY RESEARCH & BUSINESS DEVELOPMENT FOUNDATION, Seoul (KR)

(72) Inventors: Sung-Soon Park, Gunpo-si (KR); Kyeung Pyo Kim, Gwangju (KR); Young Jae Kim, Seoul (KR); Yeo Hyeon Park, Seoul (KR); Chang Gyu Lee, Seoul (KR)

(73) Assignees: GLUESYS CO., LTD., Anyang-si (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 0 days.

(21) Appl. No.: 18/249,243

(22) PCT Filed: Sep. 19, 2022

(86) PCT No.: PCT/KR2022/013986
§ 371 (c)(1),
(2) Date: Apr. 15, 2023

(87) PCT Pub. No.: WO2023/096118
PCT Pub. Date: Jun. 1, 2023

(65) Prior Publication Data
US 2024/0160603 A1    May 16, 2024

(30) Foreign Application Priority Data
Nov. 25, 2021  (KR) .......................... 10-2021-0164595

(51) Int. Cl.
*G06F 16/00* (2019.01)
*G06F 16/11* (2019.01)
(Continued)

(52) U.S. Cl.
CPC .......... *G06F 16/122* (2019.01); *G06F 16/137* (2019.01); *G06F 16/1847* (2019.01)

(58) Field of Classification Search
CPC ... G06F 16/122; G06F 16/137; G06F 16/1847
See application file for complete search history.

(56) References Cited

U.S. PATENT DOCUMENTS

| 10,963,393 B1 | 3/2021 | Ben-Yehuda et al. |
| 2014/0136758 A1 | 5/2014 | Sprouse et al. |

(Continued)

FOREIGN PATENT DOCUMENTS

| KR | 10-2014-0112717 A | 9/2014 |
| KR | 10-2019-0055721 A | 5/2019 |

(Continued)

OTHER PUBLICATIONS

Ahn Sungyong, "Implementation of Light-weight I/O Stack for NVMe-over-Fabrics", International Journal of Advanced Smart Convergence vol. 9 No. 3 253-259 (Aug. 29, 2020).

*Primary Examiner* — Tyler J Torgrimson (57) ABSTRACT

Provided is a data input/output (I/O) method using a storage node-based key-value store in a storage disaggregation environment. The data I/O method using the storage node-based key-value store includes receiving a command converted from a key-value write request of an application from a calculation node according to a communication protocol used in the storage node, converting the command into an I/O request using a key included in the command, the I/O request including a logical block address and a value corresponding to the key, and storing the value in a storage (Continued)

device of the storage node using the logical block address of the I/O request.

4 Claims, 5 Drawing Sheets

(51) Int. Cl.
　　　*G06F 16/13*　　　(2019.01)
　　　*G06F 16/18*　　　(2019.01)

(56) References Cited

U.S. PATENT DOCUMENTS

| | | | |
|---|---|---|---|
| 2018/0113810 A1* | 4/2018 | Simionescu | G06F 3/0689 |
| 2019/0146682 A1* | 5/2019 | Subramanian | G06F 3/0661 |
| | | | 711/103 |
| 2023/0054127 A1* | 2/2023 | Patwardhan | G06F 16/2255 |

FOREIGN PATENT DOCUMENTS

| | | |
|---|---|---|
| KR | 10-2019-0056295 A | 5/2019 |
| KR | 10-2019-0059664 A | 5/2019 |
| KR | 10-2021-0075845 A | 6/2021 |
| KR | 10-2021-0123236 A | 10/2021 |

\* cited by examiner

| CLASSIFICATION | BASED ON CALCULATION NODE | BASED ON STORAGE NODE |
|---|---|---|
| THROUGHPUT (MB/s) | 255 | 638 |

DATA INPUT/OUTPUT METHOD USING STORAGE NODE-BASED KEY-VALUE STORE

CROSS-REFERENCE TO RELATED APPLICATIONS

This application is a National Stage Entry of PCT International Application No. PCT/KR2022/013986, which was filed on Sep. 19, 2022, and which claims priority from and the benefit of Korean Patent Application 10-2021-0164595, filed with the Korean Intellectual Property Office on Nov. 25, 2021. The disclosure of the above patent application is hereby incorporated by reference in its entirety.

TECHNICAL FIELD

The present disclosure relates to a data input/output (I/O) method in a storage disaggregation environment, and more particularly, to a data I/O method using a storage node-based key-value store.

BACKGROUND ART

Typically, a data center has a cluster structure in which servers each including a central processing unit (CPU), a memory, an accelerator, and a storage are connected in a network. However, as data centers have recently increased in size, the cluster structures thereof are facing scalability limitations. Therefore, attempts are being actively made to switch a server-centric structure that includes all resources in a single server to a resource-centric structure that includes a resource pool formed by partitioning each server according to characteristics of resources.

In particular, in storage disaggregation, a calculation node and a storage node are physically disaggregated to form a calculation node pool and a storage pool, respectively. The calculation node and the storage node are connected through a high-speed network, and reading and writing are performed in the storage node on the basis of an NVMe-over-Fabrics (NVMe-oF) protocol.

Recently, a key-value store, which is a big data storage, provides a simple key-value interface, and is easily available in terms of storage and management, has been actively used. Key-value data is non-relational data using a simple key-value method, and the key-value store providing a key-value interface has widely been used because a large amount of data can be stored and retrieved using the key-value store. In a storage disaggregation environment, the key-value store is driven by a calculation node, and network input/output (I/O) is performed between the calculation node and a storage node through the NVMe-oF protocol.

DISCLOSURE

Technical Problem

The present disclosure is directed to providing a data input/output method using a storage node-based key-value store, which is capable of improving data input/output performance in a storage disaggregation environment.

Technical Solution

According to an embodiment of the present disclosure, a data input/output (I/O) method using a storage node-based key-value store includes receiving a command converted from a key-value write request of an application from a calculation node according to a communication protocol used in the storage node, converting the command into an I/O request using a key included in the command, the I/O request including a logical block address and a value corresponding to the key, and storing the value in a storage device of the storage node using the logical block address of the I/O request.

According to another embodiment of the present disclosure, a data I/O method using a storage node-based key-value store includes receiving a command converted from a key-value read request of an application from a calculation node according to a communication protocol used in the storage node, converting the command into an I/O request using a key included in the command, the I/O request including a logical block address corresponding to the key, and loading the value to a storage device of the storage node using the logical block address of the I/O request.

Advantageous Effects

According to an embodiment of the present disclosure, overhead in an input/output (I/O) stack of a kernel area of a calculation node can be reduced using a storage node-based key-value store.

According to an embodiment of the present disclosure, I/O amplification caused by a log-structured merge (LSM)-tree-based key-value storage driven by the calculation node can be prevented using a hash-based key-value store included in the storage node.

MODES OF THE INVENTION

Various modifications may be made in the present disclosure and various embodiments may be implemented and thus embodiments are illustrated in the drawings and described in the detailed description below. However, it should be understood that the present disclosure is not limited to particular embodiments and include all modifications, equivalents, and alternatives falling within the spirit and scope of the present disclosure. In describing each drawing, like reference numerals are used for like elements.

Hereinafter, embodiments of the present disclosure will be described in detail with reference to the accompanying drawings.

Figure 1:
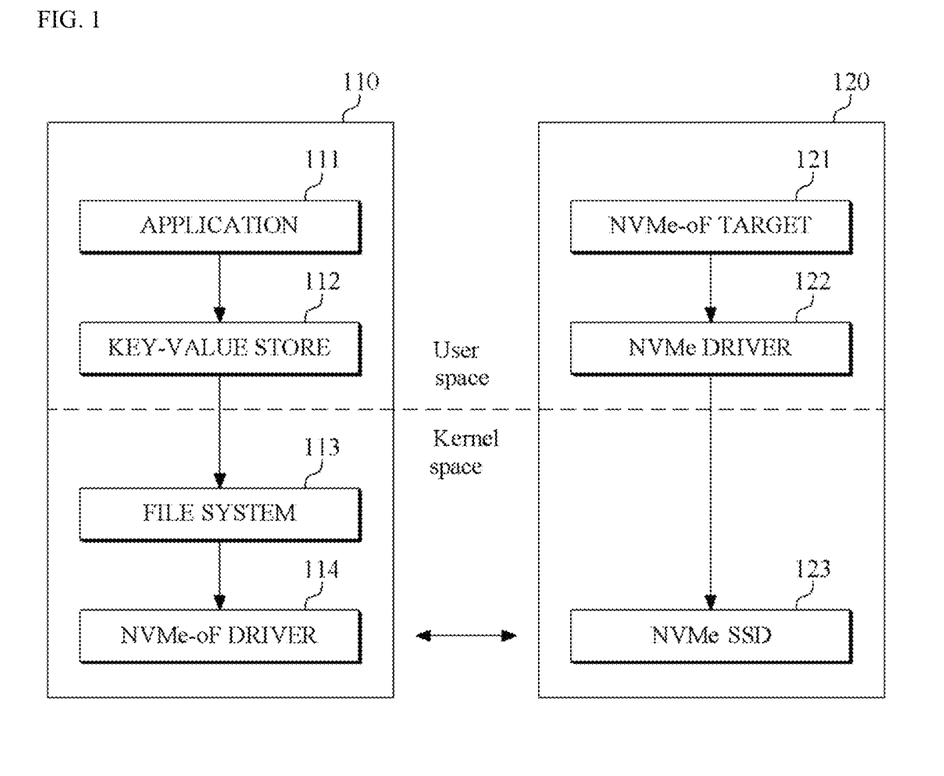
FIG. 1 is a diagram for describing a data input/output (I/O) method using a calculation node-based key-value storage in a storage disaggregation environment.

FIG. 1 is a diagram for describing a data input/output (I/O) method using a calculation node-based key-value storage in a storage disaggregation environment.

A calculation node 110, e.g., an application 111 of a terminal, transmits a key-value request for a read or write operation to a key-value store 112. The key-value store 112 converts the key-value request into a file I/O request to transmit the key-value request to a file system 113 in a kernel space. The file system 113 converts the file I/O request into a block I/O request according to an I/O method of an NVMe SSD 123, and transmits the block I/O request to an NVMe-oF driver 114. The NVMe-oF driver 114 converts the block I/O request into an NVMe command corresponding to the block I/O request according to an NVMe-oF protocol, and transmits the NVMe command to a storage node 120.

The storage node 120, e.g., a server, drives an NVMe-oF target 121 and an NVMe driver 122 in a user space using a storage performance development kit (SPDK). The SPDK is a solution suggested to reduce software overhead in a storage application, provides a software tool and a library, drives the NVMe driver 122 in the user space to avoid interruption by a context switch, which is kernel I/O stack overhead, and provides high I/O performance through polling-based I/O processing. I/O processing using the SPDK is defined with a set of block device abstraction layers (BDEVs) that are basic module units of the SPDK.

The NVMe command transmitted to the storage node 120 is converted into a block I/O request by the NVMe-oF target 121 and transmitted to the NVMe driver 122 through a BDEV. The NVMe driver 122 transmits the block I/O request to the NVMe SSD 123, and the NVMe SSD 123 stores or reads data according to the block I/O request.

In the data I/O method, a calculation node-based key-value storage is driven in a file system of the calculation node and thus overhead occurs in handling interrupt by a context switch passing through a kernel I/O stack (including the file system and a block layer) of the calculation node when I/O is performed.

In a log-structured merge-tree (LSM-tree)-based key-value storage that is commonly used, a compaction task is frequently performed in a calculation node and thus I/O amplification may occur, thus degrading I/O performance. The key-value storage of the calculation node imports data, which is stored in a storage node, in SSTable units to the calculation node to perform the compaction task, thus causing I/O amplification that results in additional consumption of limited network resources between the calculation node and the storage node, and thus, a data transmission/reception rate between the calculation node and the storage node may decrease.

To address the above-described problem, the present disclosure is designed to improve data I/O performance in a storage disaggregation environment and suggests a data I/O method using a key-value store to be driven in a user space of a storage node so as to fix an overhead problem. In addition, the present disclosure suggests a hash-based key-value storage to fix I/O amplification caused by the LSM-tree-based key-value storage.

Figure 2:
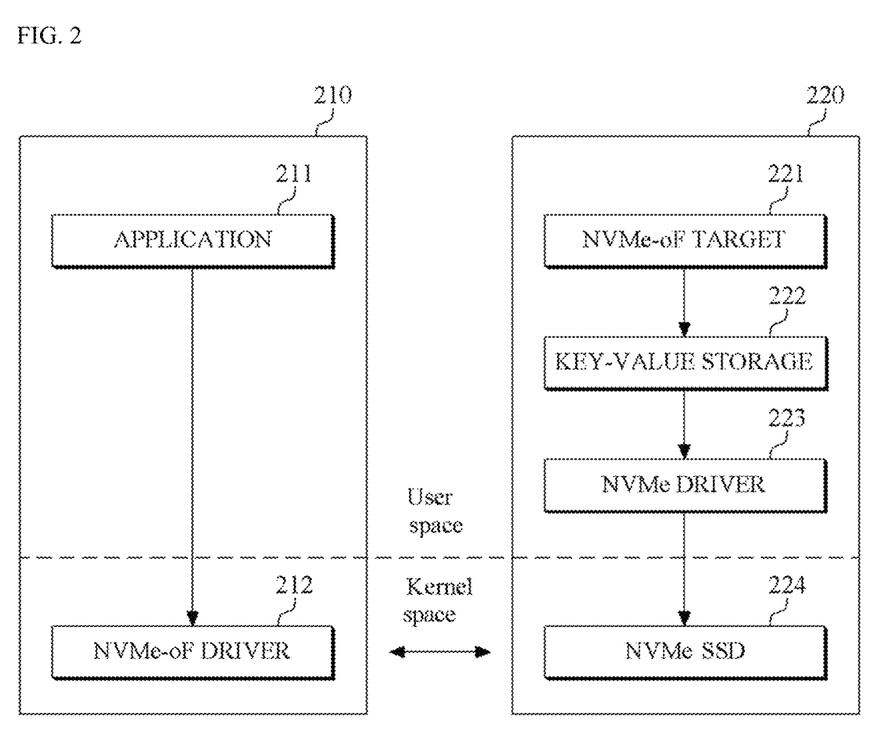
FIG. 2 is a diagram for describing a storage disaggregation environment according to an embodiment of the present disclosure.

FIG. 2 is a diagram for describing a storage disaggregation environment according to an embodiment of the present disclosure.

As shown in FIG. 2, according to an embodiment of the present disclosure, in a storage disaggregation environment, a key-value storage 222 is included in a storage node 220 rather than a calculation node 210. The calculation node 210 includes an application 211 and an NVMe-oF driver 212, and the storage node 220 includes an NVMe-oF target 221, the key-value storage 222, an NVMe driver 223, and an NVMe SSD 224. The NVMe-oF target 221, the key-value storage 222, and the NVMe driver 223 may be implemented using the SPDK.

The application 211 of the calculation node transmits a key-value request for a read or write operation to the NVMe-oF driver 212, and the NVMe-oF driver 212 converts the key-value request into an NVMe command. That is, the key-value request is directly transmitted to the NVMe-oF driver 212 without being passed through a key-value storage of the calculation node and a file system of a kernel area. The key-value request is passed through the file system of the calculation node and converted into an NVMe command by the NVMe-oF driver 212, and the key-value storage 222 to be described below is implemented in a user space of the storage node 220 on the basis of the SPDK, thus reducing overhead in a kernel I/O stack.

A key-value application program interface (API) may be used to transmit the key-value request to the NVMe-oF driver 212, and according to an embodiment, a key-value API library using an NVMe I/O passthrough command may be designed.

The NVMe-oF driver 212 converts the key-value request into an NVMe command corresponding to the key-value request, and transmits the NVMe command to the storage node 210.

The NVMe command transmitted to the storage node 120 is transmitted to the key-value storage 222 by the NVMe-oF target 121, and the key-value storage 222 converts the NVMe command into a block I/O request and transmits the block I/O request to the NVMe driver 223. In addition, the NVMe SSD 224 stores or reads data in response to the block I/O request.

The key-value storage 222 converts the NVMe command into the block I/O request on the basis of a hash function. Accordingly, I/O performance degradation due to I/O amplification caused by an LSM-tree-based key-value storage may decrease.

Figure 3:
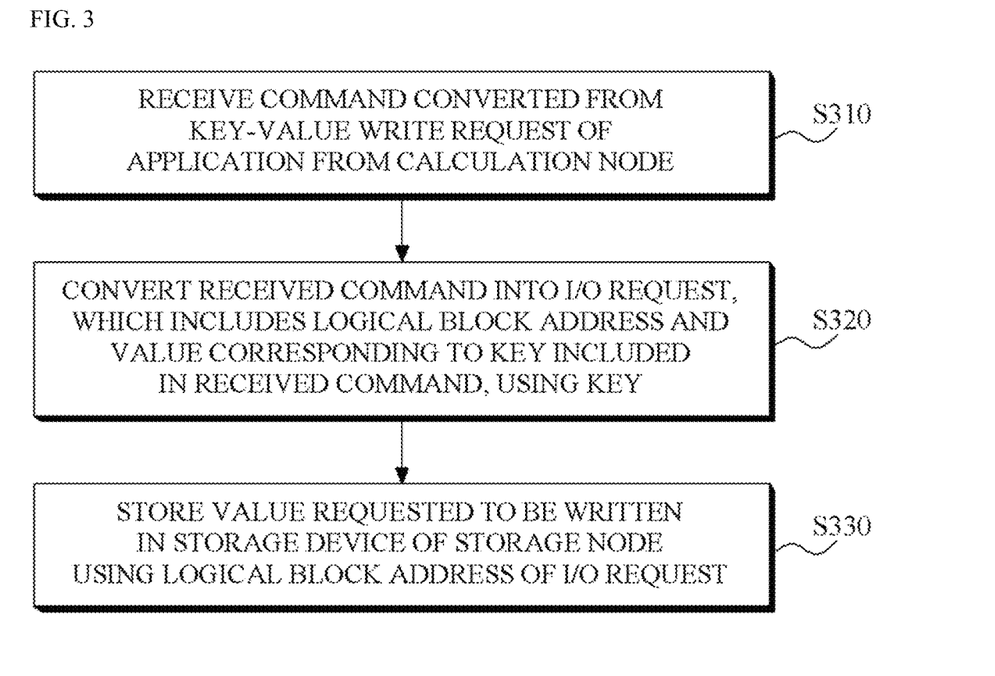
FIG. 3 is a diagram for describing a data I/O method using a storage node-based key-value store according to an embodiment of the present disclosure.
Figure 4:
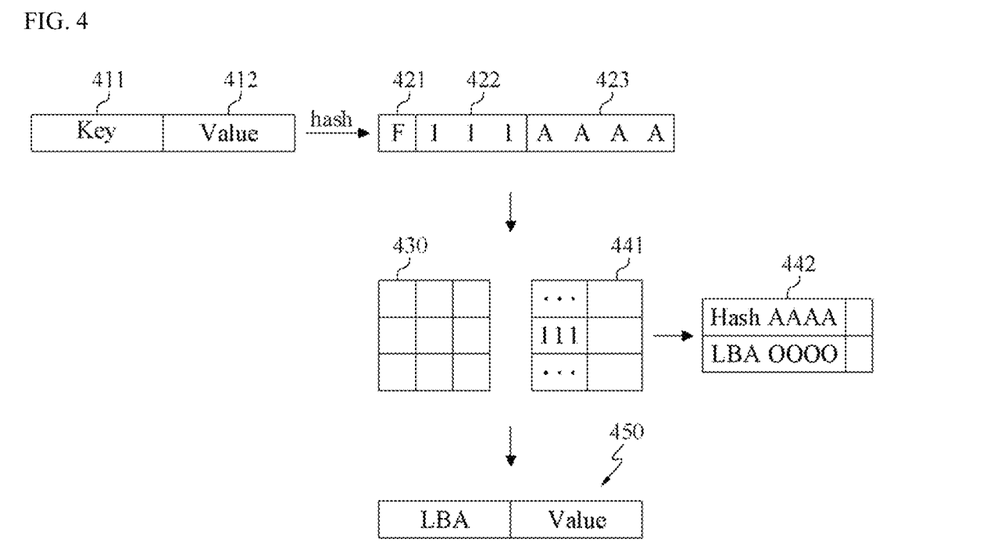
FIG. 4 is a diagram for describing a method of converting a received command into an I/O request by a key-value storage according to an embodiment of the present disclosure.

FIG. 3 is a diagram for describing a data I/O method using a storage node-based key-value store according to an embodiment of the present disclosure. FIG. 4 is a diagram for describing a method of converting a received command into an I/O request by a key-value storage according to an embodiment of the present disclosure. A data I/O method of a storage node according to an embodiment will be described with reference to FIG. 3 below.

According to an embodiment of the present disclosure, the storage node receives a command converted from a key-value write request of an application from a calculation node according to a communication protocol used in the storage node (S310). That is, the key-value write request is converted into a command by the calculation node according to the used communication protocol, and the command is received by the storage node. In this case, as described above, the key-value write request may be passed through a file system of the calculation node and converted into an NVMe command by an NVMe-of driver.

The communication protocol may be the above-described NVMe-based protocol according to an embodiment but any of various protocols may be used according to another embodiment.

According to an embodiment of the present disclosure, the storage node converts the received command into an I/O request including a logical block address (LBA) and a value, which correspond to a key included in the received command, using the key (S320). The storage node may convert a command received in a user space of the storage node into an I/O request. A value requested to be written is stored in a storage device of the storage node using the LBA of the I/O request (S330). Here, the storage device may be an NVMe SSD.

In operation S320, the storage node converts a key 411 included in the command into a hash value (421, 422, and 423) using a hash function. For example, the hash value (421, 422, and 423) may include eight unit values each consisting of four bits. That is, each of the unit values consists of four bits, and the number of unit values and the number of bits of each of the unit values may vary according to an embodiment.

In addition, the storage node selects a bitmap 430 from a bitmap group and a hash table 441 from a hash table group using the hash value. Here, the bitmap group includes bitmaps corresponding to partitions of the storage device. The bitmaps include information about storable blocks of partitions on which data is recorded and LBAs of the storable blocks. The hash table group includes hash tables for managing LBAs for partitions. Identifications (IDs) are assigned to the bitmaps and the hash tables.

In an embodiment, the storage node may select the bitmap 430 and the hash table 441 to which an ID corresponding to a most significant bit (MSB) 421 of the hash value is assigned. An MSB corresponds to the highest value among eight unit values, and for example, when the MSB is 15, a bitmap and a hash table to which an ID of 15 is assigned may be selected.

The storage node selects a storage block for the value 412 requested to be written from the selected bitmap 430, and stores an LBA of the storage block in the selected hash table 441. The storage node may determine the number of storage blocks according to the value 412 requested to be written and select the determined number of storage blocks from among storable blocks of the selected bitmap 430. According to an embodiment, the storage node may select consecutive storage blocks or select storage blocks regardless of whether the storage blocks are consecutive blocks.

In addition, the storage node may select one of the indexes assigned to the selected hash table 441 using a bit value 422 between the MSB 421 and a least significant value (LSB) 423 of the hash value, and assign the LSB 423 and the LBA to the selected index. Here, the LSB 423 may correspond to the lowest four unit values among the eight unit values, and the bit value 422 between the MSB 421 and the LSB 423 may correspond to the remaining three unit values. The storage node may select an index corresponding to the bit value 422 between the MSB 421 and the LSB 423, and the LSB 423 and the LBA may be stored in the hash table 441 in the form of a separate node 442 connected to the selected index.

The LBA and a value 450 to be written, which are stored in the hash table 441, are included in an I/O request and the I/O request is provided to the storage device.

In operation S330, the storage node may store the value 450, which is requested to be written, in a block of a partition corresponding to the LBA stored in the hash table 441.

Figure 5:
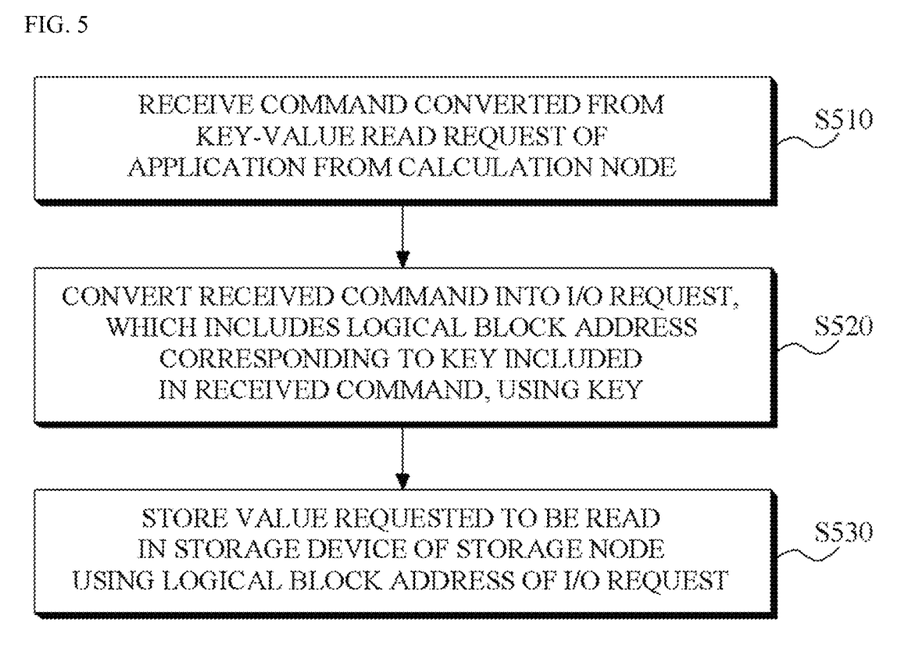
FIG. 5 is a diagram for describing a data I/O method using a storage node-based key-value store according to another embodiment of the present disclosure.

FIG. 5 is a diagram for describing a data I/O method using a storage node-based key-value store according to another embodiment of the present disclosure.

Referring to FIG. 5, according to an embodiment of the present disclosure, a storage node receives a command converted from an key-value read request of an application from a calculation node according to a communication protocol used in the storage node (S510). As described above, the key-value read request may be passed through a file system of the calculation node and converted into an NVMe command by an NVMe-of driver.

The storage node converts the received command into an I/O request including an LBA, which corresponds to a key included in the command, using the key included in the received command (S520).

The storage node converts a key requested to be read into a hash value, and selects a hash table from a hash table group, which manages an LBA for a partition of a storage device, using the hash value. Thereafter, an LBA stored in the selected hash table is identified using the hash value.

In the above-described embodiment, because a hash table is selected using an MSB of a hash value when data is stored and an index of the hash table is selected using a bit value between the MSB and an LSB of the hash value, the storage node may select a hash table on the basis of an MSB of a hash value for the key requested to be read. In addition, an index of the selected hash table may be identified using a bit value between the MSB and an LSB of the hash value, and an LBA assigned to the identified index may be identified.

The identified LBA is included in an I/O request and the I/O request is provided to the storage device, and the storage node loads a value requested to be read to the storage device using an LBA of the I/O request (S530).

Figure 6:
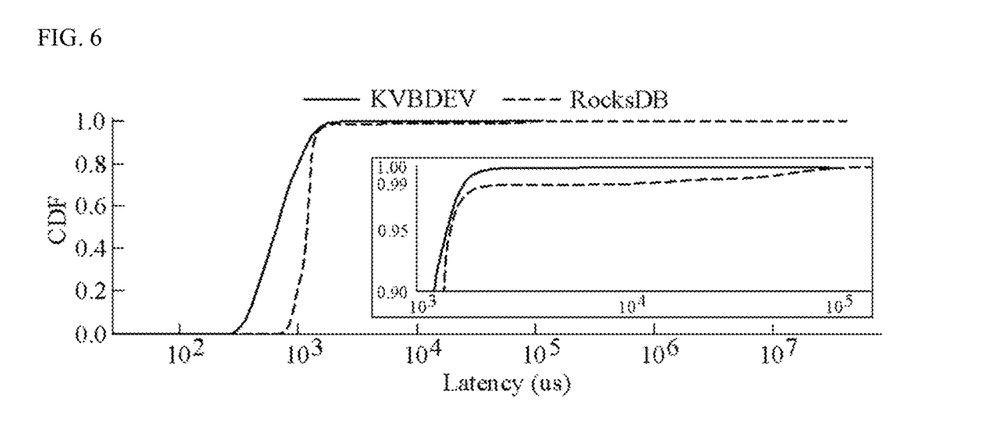
FIGS. 6 and 7 are diagrams for describing the performance of a data I/O method according to an embodiment of the present disclosure.

FIG. 6 is a diagram for describing the performance of a data I/O method according to an embodiment of the present disclosure.

FIG. 6 is a graph showing a latency versus a cumulative distribution function (CDF), in which KVBDEV represents a latency in a data I/O method using a storage node-based key-value storage according to an embodiment of the present disclosure, and RocksDB represents a latency in a data I/O method using a calculation node-based key-value storage.

An average latency was 1835 us when the calculation node-based key-value storage was used and the average latency was 735 us when the storage node-based key-value storage was used, and thus, according to the embodiment of the present disclosure, the average latency decreased by 60%.

In particular, a 99 percentile latency was 21224 us when the calculation node-based key-value storage was used, and was 1853 us when the storage node-based key-value storage was used, and thus, according to the embodiment of the present disclosure, the 99 percentile latency decreased by 90%. This means that a reduction rate of a tail latency is greater than that of an average latency, and the embodiment of the present disclosure is very effective in reducing the tail latency.

Accordingly, in the embodiment of the present disclosure, an LSM-tree compaction process was completely omitted by reducing the average latency and the tail latency, and I/O stack overhead was minimized by bypassing a kernel of the calculation node.

Figure 7:
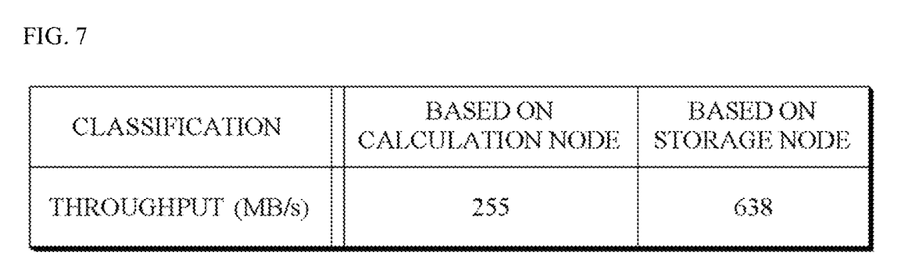

FIG. 7 is a diagram illustrating an average I/O throughput when a calculation node-based key-value storage was used and an average I/O throughput when a storage node-based key-value storage of an embodiment of the present disclosure was used, and the average I/O throughput according to the embodiment of the present disclosure increased by 183%.

The above description may be implemented as program instructions executable by various computer means and recorded on a computer-readable medium. The computer-readable recording medium may store program instructions, data files, data structures, and the like solely or in combination. The program instructions recorded on the medium may be specially designed and configured for embodiments or may be well-known and available to those of ordinary skill in the field of computer software. Examples of the computer-readable recording medium include magnetic media such as hard disks, floppy disks, and magnetic tapes, optical media such as compact disc read only memories (CD-ROMs) and digital versatile discs (DVDs), magneto-optical media such as floptical disks, and hardware devices, such as read only memories (ROMs), random access memories (RAMs), and flash memory, which are specifically configured to store and execute program instructions. Examples of the program instructions include not only machine code generated by a compiler but also high-level language code executable by a computer using an interpreter or the like. The hardware device may be configured to be operated with one or more software modules to perform operations of embodiments and vice versa.

Although the present disclosure has been described above with respect to embodiments defined with specific details such as specific components and drawings, the embodiments are merely provided to help understanding of the present disclosure, the present disclosure is not limited thereto, and various modifications and changes may be made by those of ordinary skill in the art on the basis of the above description. Therefore, the spirit of the present disclosure is limited to the above-described embodiments, and it should be understood that the following claims and equivalents thereto are within the scope of the spirit of the present disclosure.

The invention claimed is:

1. A data input/output (I/O) method using a storage node-based key-value store, comprising:
    receiving a command, converted from a key-value write request of an application, from a calculation node according to a communication protocol used in the storage node;
    converting the command into an I/O request using a key included in the command, the I/O request including a logical block address and a value corresponding to the key; and
    storing the value in a storage device of the storage node using the logical block address of the I/O request,
    wherein the key-value write request is converted into an NVMe command by an NVMe-of driver while being passed through a file system of the calculation node,
    wherein the converting of the command into the I/O request comprises:
    converting the key into a hash value;
    selecting a bitmap from a bitmap group and a hash table from a hash table group using the hash value, the bitmap group corresponding to a partition of the storage device and the hash table group for managing the logical block address for the partition; and
    selecting a storage block for the value from the selected bitmap and storing a logical block address of the storage block in the selected hash table,
    wherein the selecting of the bitmap and the hash table comprises selecting a bitmap and a hash table to which an identification corresponding to a most significant bit (MSB) of the hash value is assigned.

2. A data input/output (I/O) method using a storage node-based key-value store, comprising:
    receiving a command, converted from a key-value write request of an application, from a calculation node according to a communication protocol used in the storage node;
    converting the command into an I/O request using a key included in the command, the I/O request including a logical block address and a value corresponding to the key; and
    storing the value in a storage device of the storage node using the logical block address of the I/O request,
    wherein the key-value write request is converted into an NVMe command by an NVMe-of driver while being passed through a file system of the calculation node,
    wherein the converting of the command into the I/O request comprises:
    converting the key into a hash value;
    selecting a bitmap from a bitmap group and a hash table from a hash table group using the hash value, the bitmap group corresponding to a partition of the storage device and the hash table group for managing the logical block address for the partition; and
    selecting a storage block for the value from the selected bitmap and storing a logical block address of the storage block in the selected hash table,
    wherein the storing of the logical block address in the hash table comprises:
    selecting one of indexes assigned to the selected hash table according to a bit value between a most significant bit (MSB) and a least significant bit (LSB) of the hash value; and
    assigning the LSB and the logical block address to the selected index.

3. The data I/O method of claim 1, wherein the communication protocol comprises an NVMe-based protocol, and the storage device is an NVMe SSD.

4. A data input/output (I/O) method using a storage node-based key-value store, comprising:
    receiving a command, converted from a key-value read request of an application, from a calculation node according to a communication protocol used in the storage node;
    converting the command into an I/O request using a key included in the command, the I/O request including a logical block address and a value corresponding to the key; and
    storing the value to a storage device of the storage node using the logical block address of the I/O request,
    wherein the key-value read request is converted into an NVMe command by an NVMe-of driver while being passed through a file system of the calculation node,
    wherein the converting of the command into the I/O request comprises:
    converting the key into a hash value;
    selecting a bitmap from a bitmap group and a hash table from a hash table group using the hash value, the bitmap group corresponding to a partition of the storage device and the hash table group for managing the logical block address for the partition; and
    selecting a storage block for the value from the selected bitmap and storing a logical block address of the storage block in the selected hash table,
    wherein the storing of the logical block address in the hash table comprises determining the number of storage blocks according to the value, and selecting the determined number of blocks as the storage blocks from among storable blocks of the selected bitmap.

* * * * *